2 Sheets--Sheet 1.
L. C. BEARDSLEY.
Can-Seaming Machine.
No. 6,582. Reissued Aug. 10, 1875.
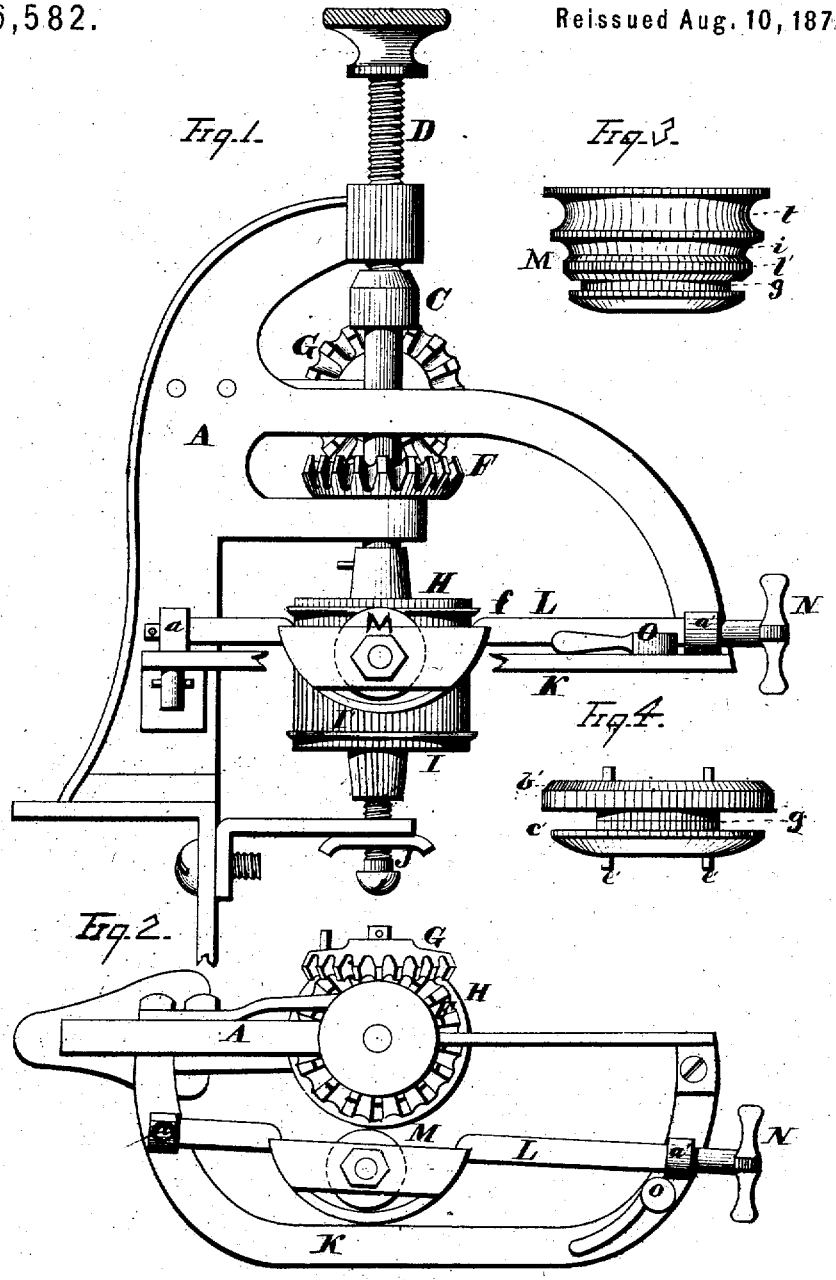
WITNESSES
W. T. Newman
Robt. M. Barr
INVENTOR
Lester C. Beardsley
By Leggett & Leggett
Attorneys 2 Sheets--Sheet 2.

L. C. BEARDSLEY.

Can-Seaming Machine.

No. 6,582. Reissued Aug. 10, 1875.

WITNESSES

W. T. Newman

Robt. M. Barr

INVENTOR

Lester C. Beardsley.

By Leggett & Leggett.

Attorneys.

UNITED STATES PATENT OFFICE.

LESTER C. BEARDSLEY, OF CLEVELAND, OHIO.

IMPROVEMENT IN CAN-SEAMING MACHINES.

Specification forming part of Letters Patent No. 156 012, dated October 20, 1874; reissue No 6,582, dated August 10, 1875; application filed February 26, 1875.

DIVISION A.

*To all whom it may concern:*

Be it known that I, LESTER C. BEARDSLEY, of Cleveland, county of Cuyahoga, State of Ohio, have invented a certain new and useful Improvement in Can-Seaming Machines, whereof the following is a description, reference being had to the accompanying drawings making a part of this specification, in which—

Figure 5:
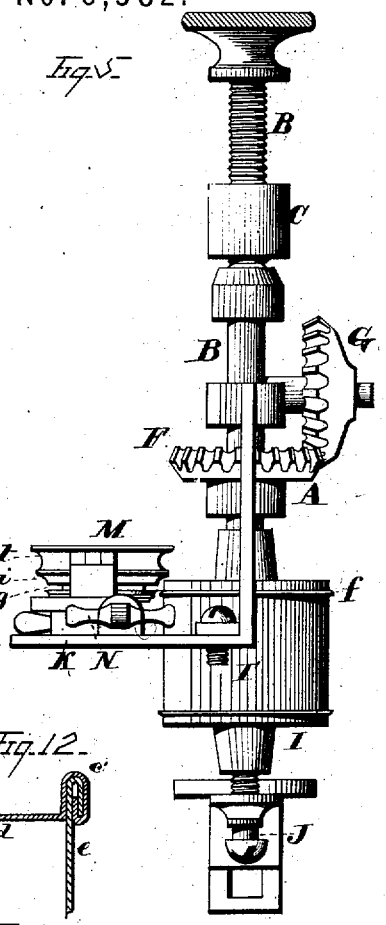
Figure 12:
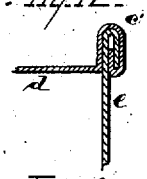
Figure 13:
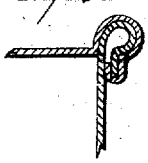
Figure 10:
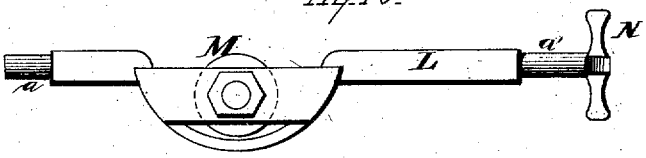
Figure 11:
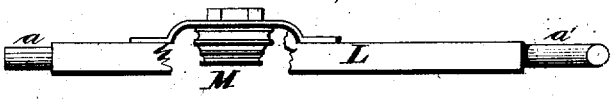

Figure 1 is a side elevation of my improved seaming-machine. Fig. 2 is a plan view. Figs. 3 and 4 are views of detached parts. Fig. 5, Sheet 2, is an end elevation of the machine. Figs. 6, 7, 8, 9, and 12 are sectional views of work done by the machine. Figs. 10 and 11 are views of detached sections of the machine. Fig. 13 is a view in section of the seam formed with the bead or tubular top.

Like letters of reference refer to like parts in the several views.

This invention relates to a machine for seaming on the tops and bottoms of tin cans; and the object thereof is to put on the top or cover of a can, when said can is filled, without the application thereto of solder.

In the drawings, Fig. 1, A represents a frame, in which is journaled a shaft, B, the upper end whereof is secured in the head C, so as to turn therein, and at the same time be raised or lowered by means of the adjusting-screws D, to which the head is fixed. To the shaft or spindle B is fitted a pinion, F, through which the shaft slides, the pinion being carried by a feather. G is also a pinion, made to engage the pinion F, whereby it and the shaft are operated. To the lower end of the shaft B is secured a head or disk, H, corresponding in size to the cover or bottom of the can to which it is applied, for holding the same while it is being seamed onto the body of the can. I, Figs. 1 and 5, is a disk or head, corresponding in size to the disk H, and upon which the can I′ stands while being operated upon, as shown in Figs. 1 and 5. Said disk I is adjustable vertically by means of the screws J. To one side of the frame K, Fig. 2, at *a*, is attached or hinged a lever, L, to the middle of which, and in such relation to the can I′ as to engage the edge thereof, as shown in Fig. 5, is pivoted a seaming-roller, M.

Detached views of the lever and roller are shown in Figs. 10 and 11, showing the lever and roller in different positions.

A detached view of the roller is shown in Fig. 3, in which the several grooves of the roller are more clearly shown.

Figure 6:
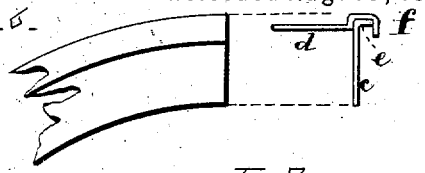
Figure 7:
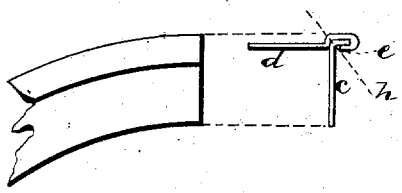
Figure 8:
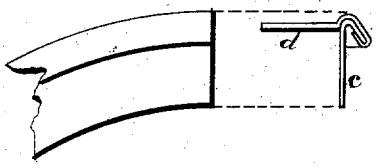

The practical operation of the machine is as follows: The body of the can I′ has its upper and lower rims turned outward at right angles, as may be seen in Fig. 6, in which *c* represents the side of the can, or section thereof, and *d* the cover. The outer edge of the rim is shown at *e*. The cover *d* is struck up, and is provided with a dependent flange, *f*, Fig. 6. The cover is of such a size as to fit on over the top and projecting flange of the body, as shown in the section of the can, Fig. 6. The can, with a cover placed thereon, as indicated by the section, Fig. 6, is stood upon the disk I, down upon which is screwed tightly the upper disk H. Thus, between the two disks or heads the can is firmly held, as shown in Figs. 1 and 5. By means of the lever L the roller M, attached thereto, is brought to the projecting edge of the can, as shown in Fig. 5, in which it will be seen that the lower groove *g*, Fig. 3, (a deep rectangular one,) of the roller embraces the edge of the cover. The can, when in this relation to the roller, is made to revolve by the pinions F G, which rotate the two disks conjointly, carrying therewith the can. As the can revolves the roller is pressed against the dependent edge of the cover, which turns it under the projecting flange *e* of the can, as shown in Fig. 7. During this doubling under of the edge or flange *f* of the cover by the square groove of the roller, the roller is kept horizontal, as shown in Fig. 2. This setting-down part of the process is followed by the turning down of the edge to an angle of about forty-five degrees, as indicated by the line *b*, Fig. 7. This is done by gradually turning the roller from a horizontal position to an oblique one, corresponding to the line *h* referred to, while the can revolves. The upper edge is usually not bent to a sharp angle, but into an easy curve, as shown in Fig. 8. By thus turning down the edge there is no liability of causing the material to break, as would be the case when employing materials of ordinary quality, were it turned to a sharp angle, as shown in Fig. 12.

BEST AVAILABLE COPY

Where the material that is employed is of a good quality the seam may be turned to a sharp angle, or, in other words, made flat and close. I do not limit myself to making the seam hollow at this upper edge.

The turning of the roller M is effected by the lever L while it is being pressed against the edge of the cover. It is, at the same time, gradually turned on its bearings *a a'*, Fig. 2, by the handle N, to an angle of about forty-five degrees, as aforesaid. At this stage of the process the groove *g* of the roller is removed from the edge or seam, and the groove *i* is now used in place of it. By means of this groove the edge of the seam is forced or rolled down close against the side of the can, as shown in Fig. 8, by forcing the roller against it horizontally, and at the same time turning it by means of the lever L until the edge is rolled flat and close against the side of the can, or until a beaded or tubular seam is rolled, as aforesaid.

The seam, when fully completed in its flat condition, is shown in Fig. 12.

The seam, when fully completed with a beaded or tubular top, is shown in Fig. 13, in which it will be seen there is formed on the edge of the seam a hollow or tubular bead, *c'*, instead of a sharp angular corner. This rounded form of the edge of the seam is made by the groove *i*, while the flat part *i'* of the roller presses the seam, or the flat part of it, down upon the side of the can. To adjust the groove *g* and *i* of the roller to the proper height to embrace the seam is the purpose of the sleeve *a'*, which forms one of the bearings of the lever L a part of the time that the roller is being used. Said sleeve, by feeding it along until it drops off from the frame upon which it rests, and allowing the lever to lie directly upon the frame, will make the difference in the height of the lever whereby the grooves of the roller are adjusted to the seam. The cam *a*, Fig. 2, operated by the handle, is the power whereby the roller is forced hard against the seam for rolling it down upon the side of the can.

With the exercise of ordinary care, a seam made as above will be water-tight; but, to insure certainty in this particular, the edge of the can may be dipped upon soft white lead. The cover or bottom is then laid on and the seam rolled down, as above described. A small amount of lead between the edge of the cover and the flange *e* of the can will be forced up into the seam; or, if it be a tubular or beaded seam, then it will be forced up into the tubular bead in the process of rolling down the seam, thereby forming, as it were, a core of lead through the bead, which will make the seam certainly tight.

Figure 9:
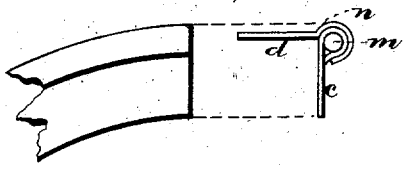

A wire is sometimes rolled into the edge of the can, as shown in Fig. 9, in which *m* represents a wire inclosed in the edge of the can. The edge of the cover is struck up with a view to this end by having a wider flange, as seen at *n*, Fig. 9. To roll this flange down around the rolled edge of the can is the purpose of the wide groove *t* of the roller M, which, by its shape, will roll the flange of the cover around the wired edge of the can, as shown in Fig. 9. The roller M is represented as being made solid; but, for the convenience of using the groove *g* for different thicknesses of tin, it is well to make the roller in two parts, *b' c'*, Fig. 4, and secure such parts together with pins or with bolts *e'*. In this way the groove can be made wider for thick material by interposing plates between the two sections.

The disk H and the disk I can each be adjusted, in the matter of distance in respect to each other, by the adjusting-screws B and J, so that large or small cans can be seamed by substituting for the disk H I others of the proper size.

I do not here lay claim to seams that are formed by my said seaming-machine, as the said seams form the subject-matter of a separate division of the original Letters Patent, of which this is Division A.

What I claim as new, and desire to secure by Letters Patent, is—

1. The can-seaming machine consisting of the two disks or chucks H I, with mechanism for causing the same to revolve, in combination with the pivoted seaming-roller M, having the described groove *g* and *i*, and mechanism for turning the said roller down around the edge of the can, all substantially as and for the purpose described.

2. The lever L, bearing or journal *a*, and sleeve *a'*, in combination with the roller M, cam O, and disks H I, in the manner as and for the purpose described.

3. The seaming-roller M, for forming a double seam, having the rectangular groove *g*, *l*, and *l'*, beveled groove *i*, and with or without the curved wiring-groove *t*, substantially as and for the purpose described.

4. In combination with the roller *m*, the rectangular groove *g* and adjustable plate *c'*, substantially as and for the purpose described.

LESTER C. BEARDSLEY.

Witnesses:

FRANCIS TOUMEY,

WELLS W. LEGGETT.